April 13, 1965  D. RUBENSTEIN  3,177,902
REINFORCED PIPE AND METHOD OF MAKING
Filed Dec. 11, 1957  5 Sheets-Sheet 1
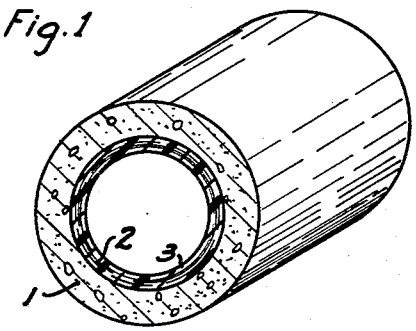
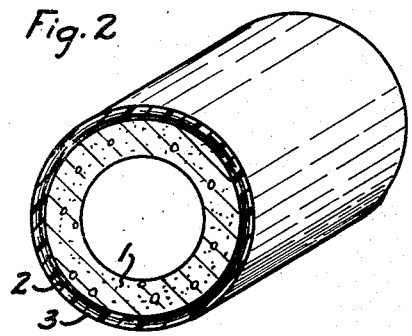
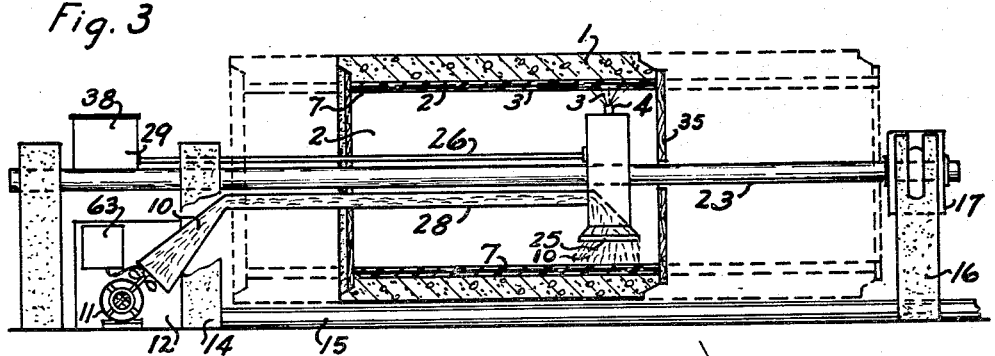
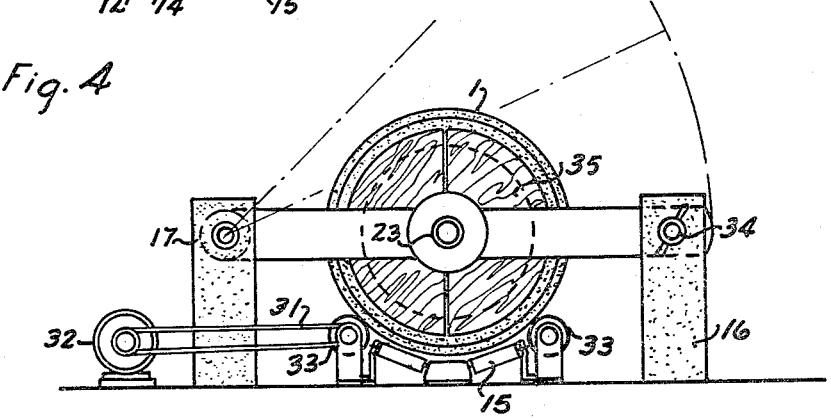
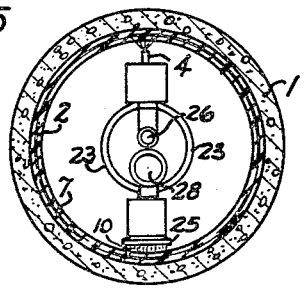
INVENTOR.
BY David Rubenstein April 13, 1965 D. RUBENSTEIN 3,177,902
REINFORCED PIPE AND METHOD OF MAKING
Filed Dec. 11, 1957 5 Sheets-Sheet 2

INVENTOR.
BY David Rubenstein

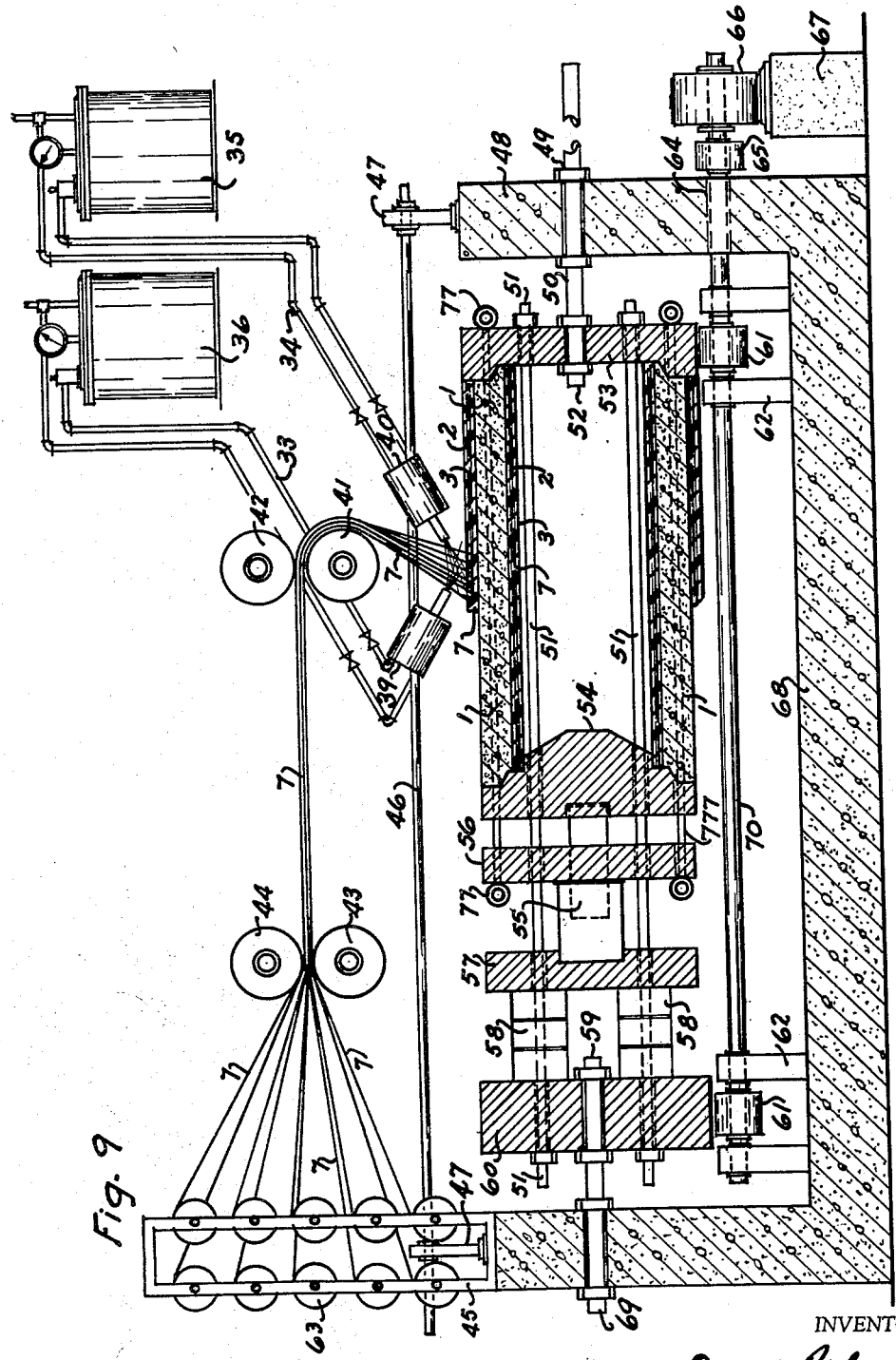

April 13, 1965 D. RUBENSTEIN 3,177,902
REINFORCED PIPE AND METHOD OF MAKING
Filed Dec. 11, 1957 5 Sheets-Sheet 4

INVENTOR

BY David Rubenstein

INVENTOR.
BY David Rubenstein

United States Patent Office 3,177,902
Patented Apr. 13, 1965

3,177,902
REINFORCED PIPE AND METHOD OF MAKING
David Rubenstein, 2750 2nd Ave., San Diego, Calif.
Filed Dec. 11, 1957, Ser. No. 702,050
6 Claims. (Cl. 138—176)

This invention relates to prestressed laminated pipes, tanks and vessels.

An object of the invention is to provide prestressed reinforced concrete or other porous structural material pipe, tanks or vessels highly resistant to dynamic loads while at the same time sustaining designed-for static loads.

An object is to provide interior and exterior surfaces material characteristics adapted to substantially protect the fluids or the other materials flowing through or stored in the concrete pipe, tank or vessel, or the like, against adverse or contaminating influences.

An object of the invention is to make reinforced porous structural material pipes, tanks or vessels of substantial strengths having therein preformed and packaged non-metallic reinforcements, said pipes, tanks or vessels thereby having resiliently resisting, and yieldingly resistant constructions.

An object is to make pipes, tanks or vessels that are highly resistant to residual nuclear radiation that might follow the explosion of an atomic bomb.

An object is to reinforce the interior and exterior surfaces and materials adjacent said surfaces made out of porous structural materials, e.g., concrete or clay products, or other stone-like products and materials, so as to prevent or minimize "spalling" of the porous structural material.

A further object is to reduce the cost, improve the quality and improve the engineering and structural functionality of pipes, tanks and vessels.

This invention provides materials possessing great strength in tension, laminated with materials of relatively low tensile strength but possessing great compressive strength.

By virtue of this invention structural materials are provided suitable for normal and extraordinary loading with compression loads, shear loads, tension loads and/or torsion loads, whether or not subject to temperature changes, impact, shock or other distorting tendency.

The invention also makes pipes, tanks and vessels with properties and characteristics tailored to the particular requirements of use. It is thus possible to accentuate any desirable characteristic, such as resilience, moisture and fluid resistance, shockproofing, light weight, thermal insulation, or thermal conductivity, smoothness, load bearing capacities in compression, tension, shear and torsion. All these capacities and properties can be designed into the resulting structure and all factory produced. In addition, by my invention pipes, tanks and vessels are easily designed to be fireproof or fire resisting, and especially can be made chemically resistant to many adverse chemical influences.

These and other objects will be apparent from the drawings and the following description thereof. Referring to the drawings, which are for illustrative purposes of embodiments of the invention;

FIGURE 1 is an isometric view of a circular concrete body having a plastic resin laminated interior construction of the invention;

FIGURE 2 is an isometric view of a circular concrete body having a plastic resin laminated exterior construction of the invention;

FIGURE 3 is a view of a spray-spinning machine and apparatus adapted for the manufacture of embodiments of the invention;

FIGURE 4 is an end view of FIGURE 3;

FIGURE 5 is sectional view of an embodiment of the invention and showing apparatus adapted to making it;

FIGURE 9 is a view of an embodiment of the invention, prestressing apparatus for making it and spray-spinning materials and apparatus;

Figure 6:
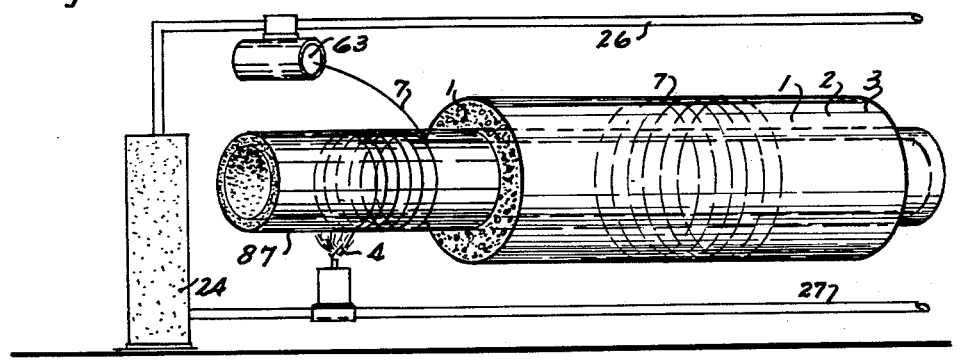
FIGURE 6 is a view of a spray-spinning apparatus adapted to make embodiments of the invention.

My several copending applications refer to prestressed preloaded structures and constructions which include features of the present invention but not claimed in said copending applications.

This application is a continuation-in-part of my copending patent application Serial No. 668,285, filed June 25, 1957, wherein is disclosed and claimed features of polymeric resin composition in their relation to providing prestressed preloaded reinforced concrete constructions.

This application is further a continuation-in-part of my copending application Serial No. 345,084, filed March 27, 1953, wherein disclosures in said specification and in the figures of the drawings thereof, disclose composite concrete pipe constructions of this invention.

This application is further a continuation-in-part of my patent application Serial No. 229,852, filed June 4, 1951, a portion of which application is now U.S. Patent No. 2,850,890, granted on Sept. 9, 1958, wherein is found basic disclosure to the art of prestressing concrete constructions by force systems induced by chemical means, e.g., polymerization reactions of polymeric resin systems, said disclosures being found in said U.S. Patent No. 2,850,890 in column 3, lines 7–75; column 4, lines 1–37; column 11, lines 3–32, but not limited thereto.

In my prior applications, I have disclosed and claimed high strength structural elements and the method of making them in which concrete bodies or other porous structural material is provided with a high tensile strength surface layer integrally bonded in, on and to the concrete or porous structural material, and, specifically I have disclosed the use of plastic compositions and plastic resin compositions reinforced with fiber glass or other high tensile strength fiber in woven or unwoven mat form, fabric, strands, slivers, cables, tapes, roving, etc.

The present invention provides cylindrical, or elliptical, or rectangular, or otherwise shaped closed or partially closed constructions like pipes, tanks and process vessels of porous structural material having greatly improved strength features and surface construction layers resistant to impact, abrasion, erosion, chemicals, etc. These prestressed preloaded constructions employ prestressed preloads derived from forces generated in and of chemical reactions used alone or together with mechanically and/or thermally derived force systems.

Preformed porous structural materials, e.g., concrete of any desired type of mixture and strength provide compressionally strong material and is used as a set and cured component. Plastic resins, e.g., catalyst-activated, cross-linked polymers of synthetic resins combined with modifying agents of inert fillers, extenders and/or pigments, elastomeric materials and rubbers of the type disclosed and claimed herein provide the plastic resin reinforcement, binders and adhesive components. Such plastic resins may be polymerized as 100% solids (no volatiles) and may be applied as a liquid of 100% solids in homogenous films as layers made in a single application, so-called "one-pass" application or can be made in multiple applications either placed at one time in sequence or at spaced apart times for convenient processing. Fibers of fiber glass, the preferred fiber of the present invention, but not limited thereto, or natural fibers like hemp, cotton, sisal, etc., or synthetic fibers like nylon, polyethylene terephthalate, (Dacron), acrylic fibers, (Orlon or Dynel, etc.,) and/or fuzed quartz, aluminum-silicate, (Fibrefrax), ceramic spun fibers, etc., with fibers of both organic and inorganic fibrous materials being used alone or together in any desired combination to provide the non-metallic reinforcement and/or filler that I use as components of reinforcement. Prestressing type steel wire, cable or rod reinforcement is used in some of the constructions in combination with plastic resin and/or elastomeric compositions and with or without fibrous reinforcements.

It is known that concrete shrinks on curing. This shrinkage is variable and is generally considered to extend over a long time, with the greatest amount of shrinkage occurring in about 28 days of curing under moist curing conditions at normal temperatures, e.g., 72° F. It is known how to vary this time period of the complex chemical reaction occurring in the setting of concrete but substantially all concrete shrinks.

Concrete does not follow Hooke's law within the elastic limits of the concrete, there being a certain amount of "plastic flow" under load. Identical deformation under load is followed by a slow gradual secondary deformation due to the applied load. In a concrete construction that is deformed a fixed amount by applied load, the strain necessary to maintain the deformation gradually decreases in amount to a lesser substantially constant amount of strain resulting in a permanent internal stress of the concrete.

In prestressing concrete by means of winding wire or cables under tension about the concrete pipes, the wire is covered with concrete and the concrete cured about the wire. This results in adverse features of shrinkage of curing having to be taken into account and from said shrinkage allowance made for the loss of prestressed preload in the wire.

I have found that a concrete or other porous structural material after its initially cured state has very little shrinkage and plastic flow problems remaining therein. Particularly, this is so in impregnated and permeated porous structural materials having resinous compositions comprising substantial portions of its integrated composition. I have found that thinner shells or walls can be used because of the higher strength composite materials of concrete and resin. Also the composite materials provide a concrete, etc., structure adapted to use in places where concrete or similar porous structural materials fail, e.g., for various reasons, e.g., acid soil, or salt water or ground water corrosion borne materials. Pipe and vessels as used in chemical processing are more easily made by my invention and are chemically resistant and less costly to make.

To overcome the inherent structural limitations that a coating on a surface of a porous structural material causes by the failure of bond at the adhesive interface by reason of impact or adverse loading, I make a surface construction layer having very substantially constructed anchorages into and of the porous structural material. The impregnating materials disclosed herein comprising polymerizable resin compositions, or resinous or elastomeric compositions, or the like, set and cure and convert from fluid state to solid state material by means of chemical reaction, e.g., polymerization reaction. This chemical reaction is activated by activators or catalyst means and by heat. The reaction itself creates additional heat.

The introduction of this heat expands the composite materials receiving said heat. The expanded material increases in size and the body of the said composite pipe structure has its pores and interstices connected therewith increased in size so that on the return to ambient temperature of the composite materials, the force systems provided by the expansion and subsequent shrinkage of the said materials prestress preload said composite pipe body. My process of impregnating and permeating the porous structural material, e.g., concrete, with a resin, or resinous or elastomeric composition placed on and into the body of said porous material, provides, when set in said body, a resin or resinous or elastomeric solid having a predetermined amount of shrinkage. This shrinkage provides stressing means which utilize the substantial and large forces resulting from the chemical reactions of e.g. polymerization of thermosetting resins and the like, whereby the plastic resins, resinous substances, resin-elastomeric substances and elastomeric substances and/or rubbers congeal, set, fix and shrink-fit into place. Expansion forces derived from heat obtained only from and during the polymerization reaction of the polymeric materials of this invention expand the materials of the laminated construction and the result of cooling may be used as useful means of prestressing. The forces so generated at the same time prestress the materials of the surface construction layer and its adjacent body of porous structural material, e.g., concrete, which the plastic resins or resinous or elastomeric compositions inclose and bond together as well as prestress the concrete bodies to which the laminations comprising the surface construction layers are applied and on the completion of said chemical reaction, e.g., polymerization, integrates the combination into a unitary structure, e.g., a pipe section, a tank or a vessel.

This invention provides prestressing of preloads into concrete bodies of a cylindrical, or elliptical, or rectangular, or otherwise shaped nature by the shrinkage forces provided by the shrinking, condensing, tightening action which introduces said prestressed preloads into the porous structural material, e.g., concrete, as the materials of the surface construction layer lamination undergo setting, cooling, solidification, chemical reaction, shrinking, condensing and unification with the preformed, porous structural body, e.g., concrete pipe section.

This can be likened to the same thing as occurs to a wooden wheel when a blacksmith "sweats-on" a steel or iron rim and the wheel becomes tightened as the wood of the wheel takes up the prestress stresses introduced by the shrinking of the cooling iron or steel.

The transfer of stress into the precast concrete component is accomplished by contact of the plastic resins, e.g., unsaturated polyester resins, or other resins that fill porous holes and interstices connected therewith and by the general porosity of the concrete, and on bonding together the plastic resins, fiber glass, or other fibers or reinforcements, fillers, steel wire or cable reinforcements with the concrete. The shrinkage stresses of the plastic resins, e.g., unsaturated polyester resin compositions, and other components that come about by heating and cooling, setting or fixing and/or chemical reactions thus introduce prestress forces into the precast concrete pipe constructions and structural components thereof, and by this means make such pipe constructions and structural components thereof, preloaded for ultimate use, and thus makes them stronger, resilient, flexible and better suited to end uses.

The stressing means includes features and novel means which utilizes the substantial and large forces resulting from the chemical reactions of polymerization of thermosetting resins and the like, and the expansion forces of the materials of the laminate, whereby the plastic resins, congeal, set, fix and shrink-fit into place. The forces so generated at the same time prestress the materials of the laminate which the plastic resins inclose and bond together as well as prestress the concrete bodies to which the laminations are applied and integrates the combination into unitary structures and members as completed pipe sections and lengths. The prestressing forces resulting from the chemical changes are measurable by the known shrinkage of the plastic resins or plastics used.

In combination with thermal pre-compression or tension forces, with mechanical pre-compression or tension forces, or forces generated in-situ, the chemical forces provide means, alone or in combination with thermal and mechanical prestressing to provide prestressed preload in and of and with the materials of the composite structure making up the prestressed construction, e.g., pipe, tank or vessel. The stresses of shrinkage resulting from such a reaction as chemically induced as, e.g., a polymerization reaction, said reaction chemically induced as said reaction occurring in the setting of, e.g., an unsaturated polyester resin composition, are transmitted as the complex stresses of shrinkage in the plastic composition through the interface bond area of the laminated structure or construction or pipe, tank or vessel as compressive stress in the surface of the bonded materials.

FIGURES 1–15 illustrate various constructions of pipe, tanks or vessels which are coated, laminated and integrated on their surfaces with plastic-resin bonded fibrous reinforcements, e.g., fiber glass which may also contain other fillers, bonding agents, binders or reinforcements in addition to, or instead of the fibrous material, e.g., fiber glass fibers. Pipe such as is shown in FIGURES 1, 2, 3, 4, 5, 6, 7, 8, 9, 10, 11, 12, 13, 14, and 15, or tanks or vessels similarly made are advantageously used for water conduits, aqueducts, sewers, and sewer manholes, sewage processing constructions, etc., fluid transmission lines in industry, commerce and military operations. A typical embodiment comprises a concrete body shown in section in FIGURES 1, 2, 3, 5, 7, 8, 9, 10, 11, 12, 13, 14, and 15, with an inner layer composed of fiber glass (or other strong fiber or reinforcing strands) embedded and bonded by plastic resin compositons, advantageously polyester resin compositions, and/or epoxy resin compositions or compatible resinous compositions of two or more resins, elastomers, or synthetic substances. The flowable characteristics, and in general placement features in the processing of such materials when made into formulated compositions of my invention together with end product features and characteristics of strength, durability, chemical resistance, load bearing characteristics and features, etc., determine the specific formulated compositions I employ. The materials are worked and handled and processed for the best use of their structural and civil engineering features applied and used in the light of and knowledge of the art of chemical engineering. The composite structure, e.g., a large conduit of prestressed concrete is designed for specific use in the full and broad sense of engineering design. The novel features of surface layer construction and the strength and load bearing characteristics of such pipe are greatly increased by the laminated construction, the concrete being excellent for resisting compressive strains, the fiber glass plastic-resin composition affording high resistance to tensile stresses and adding substantially to the compressive strength of the concrete materials of the composite pipe as well as having high strengths in shear, torsion and compression in its use as a composite composed material.

In embodiments of my invention the surfaces are extremely smooth and uniform, and as a consequence such pipe will deliver, e.g., 15 to 20% more water (or other fluid) and because friction loss is reduced to a minimum, turbulence and joint obstructions to flow are practically eliminated. This increase in efficiency permits economies by use of smaller pipe sizes. Resin bonded joints solve many problems, leakage and entrance of roots or other growths into pipes through joints being restricted or eliminated.

By way of simple example, the strength of such an untreated raw concrete pipe, e.g., as tested in an A.S.T.M. accredited testing laboratory, showed 1350–1400 lbs. per linear foot, and breaking strength of 118 lbs. per linear inch of pipe. When this same pipe had fiber glass-resin composition comprised of 2 oz. fiber glass mat bonded, integrated and laminated in, on and to the inside and outside surfaces of said concrete pipe with an unsaturated polyester resin composition which was cured and set to make the construction a unitary product, the same tests with loading applied on a standard three point bearing showed 500 lbs. per lineal inch of pipe sustained before breaking, i.e., five times that of the untreated pipe. Sufficient strength is thus developed to eliminate the need for steel reinforcement. This test was stopped at the loading of 500 lbs. per inch and the sample remained intact, with the only evidence of impending failure a slight cracking of the concrete body barely discernible to the eye, and with no discernible failure in either the inner or the outer plastic resin composition fiber glass reinforced surface construction layers.

When such pipe is used in corrosive soils or for transmission of corrosive liquids, the plastic-resin fiber glass construction protects the concrete and there is no danger of failure due to corrosion of reinforcing rods, etc.

Such pipe can be driven as piling or well casing, and in such circumstances of use its high strength stranded construction and operating high strengths stands in good stead.

The plastic-resin fiber glass reinforced surface layer constructions integrated and bonded to the porous structural material, e.g., concrete pipe, can be made resilient and resistive, pliable and yet strong and able to take without failure greater strains and stresses, in tension, compression, shear and torsion, e.g., as imposed by earth loads or other designed loads, with a margin of safety for withstanding earthquakes, bombing and the like. In all cases concrete or the like, protects plastic resin surface layer constructions from heat and abrasion, and notch and scratch effects are avoided. The plastic resin composition protects the concrete, or the like, and strengthens it.

If desired, a thin cylindrical steel core or a plastic resin-fiber glass may be used within the pipe upon which wire laminated core or fiber glass strands embedded in a plastic resin composition suitable for prestressing is wound or spun, and this may be embedded in a suitable layer of concrete which is then suitably cured and dried and the plastic resin composition, such as polyester resin, e.g., an unsaturated polyester resin composition, may then be applied by spraying, embedding, layering, painting, or other method, including particularly "spray spinning," and into this layer of plastic-resin and suitable binding components, fiber glass or other fiber can be applied, and will bond and unite with the pipe body, thus providing added strength as above described, and fluid-tight sealing of the surface.

On a polished stainless steel core or mandrel or aluminum core with highly polished surface, or other mandrel covered with cellophane, or other kind of film or sheet, a coat of polyester resin (or other suitable resin) can be "spray-spun" by revolving the mandrel beside a suitably mounted spray gun on a sliding or geared support so that the sprayer travels up and down the length of the mandrel so that an even coat of resin-plastic composition is deposited on the mandrel. On another sliding or geared support fiber glass films, mats, cloths, unidirectional fibers, flock, multi-directional fibers, rods, cords, cables, roving, tapes, etc., advantageously of fiber glass, are carried and fed onto the mandrel as it is coated with the plastic composition so as to reinforce by its incorporation into the body of the plastic resin composition. Thus a fiber-resin layer is built up on the mandrel to a desired thickness for required strength.

By using a heated mandrel, the plastic-resin composition can be immediately cured at the desired speeds, or air-setting plastic-resins may be used which cure up on the mandrel without heat. On withdrawing the mandrel and removing the cellophane liner from the inside surface of the pipe, the pipe will be found to have an exceptionally smooth and almost perfect surface, the coefficient of smoothness being 15% to 20% better than existing pipes.

It is important to note that the fiber glass in this liner is fully protected by the plastic resin composition against leaching and abrasion from substances carried in the fluids which may be passed through the pipe. To assure such protection, the fiber glass or in fact any other fiber used, before it is applied on the mandrel or as it is applied on the mandrel, is thoroughly coated with the resin composition, e.g., by the spray gun or e.g., by being processed through an impregnating apparatus. For this purpose the second mandrel from which the fibrous material is spun or unrolled, is co-ordinated with the spray gun for the resin so that the fibers are well coated and shielded as they come to rest on the mandrel and are further coated by spraying the plastic resin composition thereon until the desired thickness is achieved. The resulting reinforced plastic-resin compositon fiber pipe or pipe liner may be finally united with the preformed and cured concrete or other porous structural material pipe body and this may be facilitated by impregnating and coating the concrete with a bonding-type resin or resin composition such as an unsaturated polyester resin, or modified-polyester resin as known in the art, the surfaces of which are then prepared for the fiber-resin composition lamination by properly sanding, grinding, or by treatment with a suitable chemical, e.g., acid washing, which assures an integral bonding of the lamination to the surface construction layer or coating that is bonded thereto.

Figure 13:
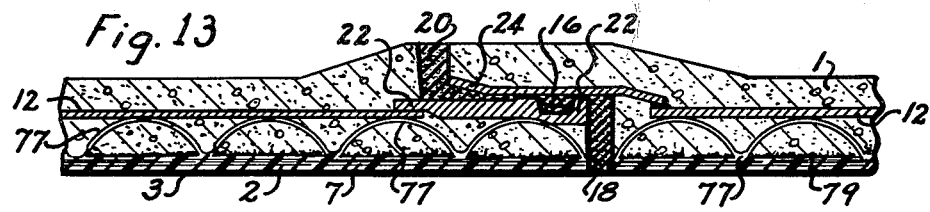
FIGURE 13 is a cross section of a portion of a looped reinforcement and wall of a portion of a prestressed laminated concrete pipe, tank or vessel.

In FIGURE 13 is shown another method of anchoring the fiber-resin compositon surface construction layer to the porous structural material, e.g., concrete. In this case the fiber glass or other reinforced resin facing is extended in a series of cable-like loops 77 in which the fiber is protected by shielding with the plastic-resin composition, as hereinabove mentioned, and these loops project into the concrete body to give anchorage for the facing. With this method of manufacture, the facing may be preformed with these loops and the concrete then applied as a coating, e.g., by the "spray gun" method or by casting in suitable forms.

A series of sections of concrete pipe may be joined into the long pipe line or conduit of high strength by means of the resin-fiber facing formed in-situ, e.g., by spray spinning, with effect somewhat similar to that described in connection with the joining of concrete block or other structural elements of my invention disclosed and claimed in my copending applications above referred to. These structures are unitary structures having high tensile strength plastic resin fiber reinforced surface construction layers. Such constructions have high resistance to shock and therefore advantages for areas where earthquakes or bomb shock may be encountered, or wherever a rigid construction is required, but one which can accommodate substantial resilient flexure without impairment to the units or the joints.

A further improvement can be accomplished by incorporating in the concrete a quantity of the polymerizable plastic material, either air-setting or chemical setting or thermosetting. When the concrete mixture has been poured and set, the plastic-resin effects a reinforcement of the concrete. Before the resin in the concrete is fully cured, it may be softened or melted by heating or chemically combined and thereby improve the bond with the concrete or with the facing or reinforcing material at the surface of the concrete.

There are many types of resin fabrics which can be used with my invention, among which particularly may be mentioned the polyester resins, silicon resins, synthetic rubbers and natural rubbers, alone or in combination with other plastic resins. Binders of many different qualities are available, and in the application of the present invention one may choose among others already available and those which may hereafter be developed to meet the particular requirements of any application of the present invention.

It is to be understood, also that the present invention is not limited to the use of any particular concrete aggregates or to organic or inorganic aggregates alone. Fillers, including cotton, wool, sisal, hemp, nylon, paper, cotton seed hulls, straw, grasses, wood, bamboo, and/or many other materials known to the art can be used in the practice of my invention.

Pipes, tanks, and vessels of this invention are adapted to withstand relatively high external or internal pressures, and if temperature resistant resins are used, may be maintained at relatively high temperatures or, if desired, at low refrigerated temperatures. Thus, for example, silicone resins may be used which will withstand temperatures up to 250° C. and relatively low freezing temperatures.

Such embodiments of this invention made according to the present invention, of a combination of concrete with reinforced plastic, has better structural properties and is less expensive than such apparatus made of plastic compositions alone. Thus, for example, the concrete which is used to take the compressive load according to this invention may have compressive strength from 2,000 to 10,000 lbs. p.s.i., as required by the particular use. For example, a centrifugally cast concrete pipe of 5,000 p.s.i. concrete may be laminated with a high strength plastic-resin composition of 22,000 p.s.i. flectural strength of e.g., ¼" section, to make excellent process equipment, such as a tank for hot processes or water heating.

Although in most cases considerations of cost and structural properties will lead to the use of Portland cement concrete, a variety of characteristics is obtainable by varying the choice of aggregates, cements, plastic-resin binders, fillers, fibers, metals, etc., and the concrete can be made, if desired, without using Portland cement by use of cements other than Portland cement, and even by use of plastic-resins as the binding and cementing material of the and for the aggregate. Laboratory tests show good structural characteristics for concrete made in this manner. Where time is of the essence and one cannot wait for Portland cement to set and cure to its required strength the use of plastic resin composition or elastomeric composition can be used and in the matter of minutes e.g., 5 minutes to 10 minutes as the aggregate binder sets and strengths are obtained equal to and generally greater than many Portland cement concretes.

In some cases the concrete may be omitted entirely and, for example, expanded plastics or other lightweight materials may be sandwiched between the high tensile plastic facings according to the present invention, which afford surface strength and shock-resisting qualities.

For tanks, vessels and the like, the use of fiber glass mats, cloths, cables, ropes, roving, etc., around or within the concrete body is advantageously used for prestressing. This, however, can be accomplished much more effectively, quickly, and inexpensively, because it is possible to spray the plastic-resin binders under appropriate pressure that will firmly fix the fiber glass or other reinforcing materials and at the same time insulate and shield the fibers from the concrete or other porous structural material so that the prestressing member can be kept free from the deleterious effects of direct incorporation in the concrete.

FIGURES 1–15 inclusive show shapes and constructions which are only illustrative and almost any conceivable shape that is required in industry, military or civilian use can be made according to this invention.

Figure 10:
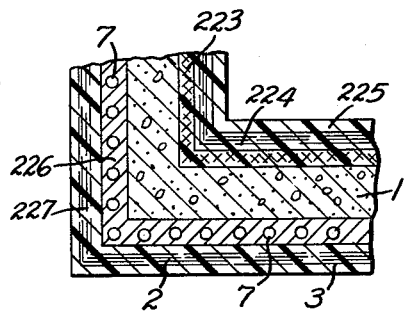
FIGURE 10 is a fragmentary view of an enlarged cross section of an embodiment of the invention.

A particular structure suitable for use in vessels is shown on an enlarged scale in FIGURE 10. Here, the central body of concrete has on each face a coating, i.e., a surface construction layer, 223 of plastic-resin binder with fillers and mat-type fiber glass reinforcement. A unidirectional high strength fiber glass 224, which may be made of parallel fibers, cables, rovings, cords, wires, or ropes, or tapes, of glass fiber or other tensilely strong material, i.e., in the range of 10,000 to 125,000 p.s.i. tensile strength, is laminated in the resin-plastic over the mat reinforcement of the inner layer 223.

Embedded in, or instead of, one of the layers 223, 224, metal tubes or wires may be provided for circulation of fluids or for electrical resistance heating.

On the surface of this structure, plastic-resin layer 225 is integrally combined, which constitutes the wearing surface, and may include decorative colors, fabrics, papers or prints adapted for industrial marking, guage lines, safety pressure, designations, etc.

The improvement in surface provided by this invention wherein concrete pipe is evaluated for its coefficient of smoothness by Hazen and Williams' formula, e.g., coefficient C–140 when compared to plate glass taken as C–100 to C–105 and then compared to the products of this invention, by test shows the surface to be C–104 to C–106. The smoothness coefficient of e.g., stainless steel or cellophane is the criteria I use for smoothness coefficient because my invented pipe line surfaces or tanks or vessels are cast, laminated and made against such surfaces. Taking commercial concrete pipe as having a coefficient of smoothness of C–140 and taking my invented pipe as C–105 the improvement is C–35 or 25% greater flow in my invented pipe. For equivalent flow in this design of pipe I can use 25% less pipe just on the improvement made on smoothness.

Substantial benefits and improvements are made in flow characteristics, strength, impact resistance and chemical and environmental resistances to structures like pipes, tanks and vessels. Chemical prestressing of the porous structural material greatly enhances the strength and utility of the structures. Fibrous reinforcement e.g., fiber glass strands or roving has been tested at ultimate strengths of 300,000 to 5,000,000 p.s.i. in tension having a 3% to 3½% elongation with perfect recovery before failure under ultimate load. Commercial fiber glass laminates e.g., already tested show strengths of 50,000 p.s.i. to 100,000 p.s.i. in flexural loading.

Referring to FIGURES 1–15 showing embodiments of the invention,

FIGURE 1 illustrates a round conduit, pipe or hollow cylinder or column and is laminated and covered on the inside surface thereof with a plastic resin composition which may or may not have a filler therefor and bonded fiber glass fiber and/or other fillers, binders or reinforcements designed to meet usual or special structural design requirements. Such requirements may be e.g., pipe for water conduits or aqueducts, sewers, fluid transmission lines in industry and commerce, military piping uses, civilian or military residential piping, etc.

In the drawing of FIGURE 1 is illustrated the concrete 1, the fiber glass 2 and/or other suitable fiber or reinforcement, and the plastic resin composition 3, e.g., polyester resin composition, or e.g., epoxy resin composition or even a compatible mixture of epoxy-polyester resin composition, or other adaptable resinous compositions. The strength and load bearing characteristics of such a pipe come from the laminated construction, the concrete being excellent in resistance to compression stress and the plastic resin composition-fiber glass reinforcement being preferred but not limited thereto for the tensile stress reinforcement.

FIGURE 2 shows an embodiment wherein the exterior surface of a concrete pipe line is covered, laminated and reinforced with a plastic resin fibrous reinforcement with concrete or other porous structural material 1, fiber glass fibers 2 and plastic resin composition 3 being integrated and combined into a unitary construction.

FIGURES 3, 4, and 5 show apparatus for providing laminated concrete pipe constructions adapted to providing many different embodiments of the invention.

Concrete pipe 1 is provided as a cured and dried precast concrete element. It is essential to remove the water from the pores in the use of many but not all resins to insure designed bonding, permeation and penetration of resin substances and compositions into the body of the concrete or the like. Fiber glass fiber 2 is provided as a supply of roving 63 which is fed into a roving cutter 11 and the resultant short fibers are blown by air, which I may heat or may not heat depending upon the resin setting characteristics of the composition I use in any particular formulation.

The chopped up fibers are cut to any desired length, e.g., about 2" length and are varied in length for specific designs. The chopped fibers are blown into the duct 28 and out through distributor head 25 from which the fiber glass fibers are deposited and layed on the plastic resin composition 3 as it is layed on the concrete 1 from spray head 4. As the fibers lay on the resin composition they are covered and build up into a mat of any desired thickness making a resin-fiber fabric lamination to and with the concrete. Pressure is provided by air to drive the spray head and fiber distributor head and can be adjusted to various resin-fiber mixtures. The resin composition is supplied from supply tank 38 by pump 29, but in the apparatus, through pipe 26 to distributor spray head 4. The plastic resin composition 3 and fiber glass 2 feeding apparatus is mounted on support shaft 23.

A concrete pipe element 1 is placed on conveyor 15 so it can be spun by drive rolls 33 one of which (or both) are driven by belt 31 which is driven by motor 32.

A bearing 23 supported on a bar 17 is adapted to being raised so pipe element 1 can be placed between the spinning abutments 14 and 16 and is locked in place with member 34.

The concrete pipe element 1 is closed at its ends with temporary closures 35 which are made of wood or metal or other material and the pipe element caused to spin at a predetermined speed while at the same time the fiber glass fibers 2 and plastic resin composition 3 are "spray-spun" onto the inside surface of the pipe to a predetermined thickness and into a unitary bonded surface construction layer.

At times I first spray a resin composition layer on the concrete and get a desired penetration and permeation before I laminate the fibers 2 into the resin composition layer. The pipe element 1 is caused to move back and forth on the conveyor by means not shown, or manually, to provide an even layer of laminated construction on the inside of the pipe element.

At other times I use one of my prepared enveloped constructions having elongated strands 7 of fibrous material, e.g., fiber glass unidirectional fiber located and spaced for a given designed construction. I lay this prepared laminated enveloped construction in a sticky bonding layer of plastic resin composition 3 which I have previously placed.

Another embodiment is made by placing a mat of dry fibers on a layer of sticky bonding resin composition and rotated at a slow speed until the resin composition comes through the mat and sticky resin thus saturates the mat. This in certain embodiments, but not all, may be allowed to partially set after which the speed is increased and additional resin composition and/or fibers are placed to complete the laminated construction. The centrifugal force generally drives the fibers down into the resin composition because the specific gravity of the glass fiber is greater than the resin composition when the resin composition is used with little or no filler therefor. By increasing the filler content or by making the resin composition thrixotropic, balanced design can be had so that the fiber layer if it be a layer, can be supported between two layers of resin composition. In this way I make spun surfaces that are very smooth, about like glass, since in the process it is possible to orient the constituents of the composition to provide plastic resin surfaces of high gloss and smoothness.

When I want directional reinforcement 7 in the laminate I use elongated strands 7 in predetermined alignment and direction, e.g., longitudinally of the pipe element 1 or e.g., helically wound at a specific angle of placement.

FIGURE 6 shows the placing of fibrous strands 7 on a e.g., stainless steel mandrel 87 having a highly polished surface. The plastic resin composition 3 is spray-gun from spray head 4 and embeds fibers 7 as the mandrel rotates. The fibers 7 may be tensile fibers tensioned by apparatus shown in FIGURE 8 to a predetermined preload which I can increase in specific designs by the shrinkage features of the plastic resin composition used in that specific design, e.g., an unsaturated polyester resin composition having a silica filler therefor. Concrete pipe element 1 can be made over the mandrel and later bonded by heat or chemical reaction to the porous concrete material of the pipe element 1. Also the concrete pipe element 1 can be slipped over a prepared laminated construction layer which is a preferred manner in many uses.

The exterior surface construction layer is placed by the same apparatus and thus a concrete pipe element 1 can be laminated inside and outside of its surface to provide many different features of construction.

When pipe lines are to be exposed to chemicals in the earth or in use, e.g., oil field uses, or when salt water or corrosive fluids are carried, or under conditions found in chemical plants, etc., the exterior surface of pipe lines having e.g., a polyester-epoxy resin composition provides protection to the pipe line and its contents. Many other resins or resinous compounds, but not all, resins, rubbers, elastomers, or compatible combinations thereof are available in the art and are becoming newly available almost daily in the rapid developing technology of plastics for use in specific and designed constructions of this invention. No limitation is intended in the specific examples disclosed herein the requirements being as disclosed. The tensile, compression, shear and torsion strengths of the plastic resins, etc., determine each particular use together with features inherent as found in the materials or as modified by me in my formulations govern the designed uses of the materials.

Figure 7:
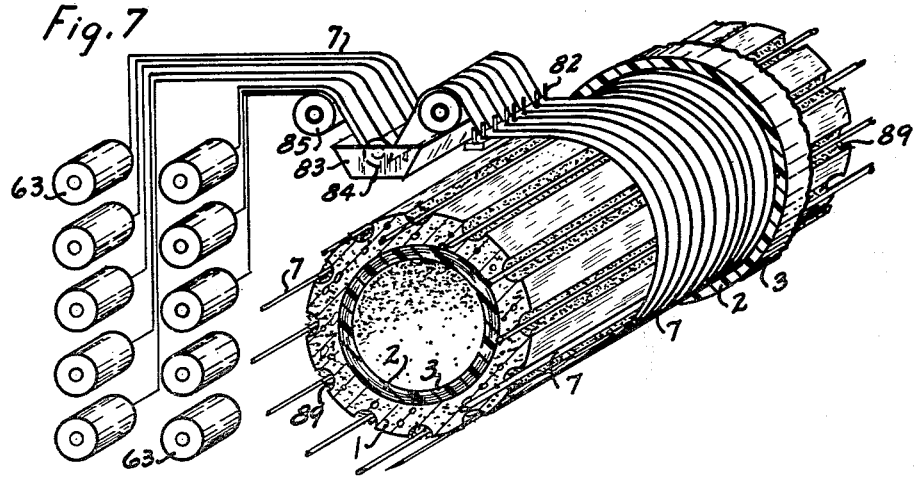
FIGURE 7 is a view of another means of making embodiments of the invention.
Figure 8:
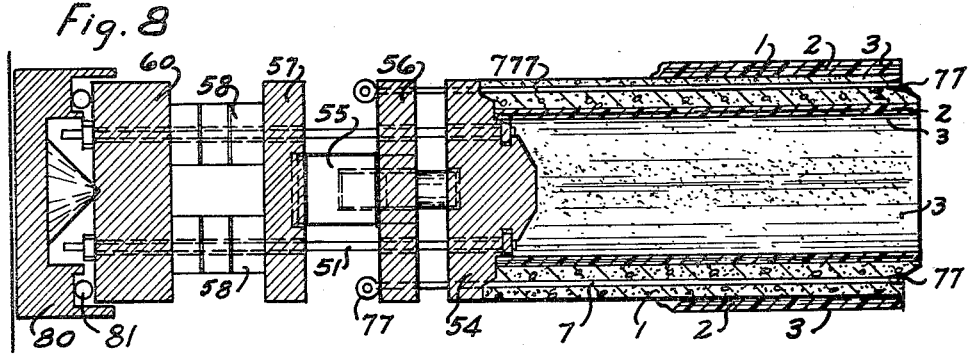
FIGURE 8 is a view of an embodiment of the invention and prestressing apparatus for making it.

FIGURES 7 and 8 shows another embodiment wherein a porous structural element 1 is precast having grooves. Longitudinal cables or reinforcements 7 having e.g., end enlargements 77 are spaced in the grooves and end anchored by the enlargements thereof. The opposite ends are placed in a pulling head 56 through a bearing head 54 against which hydraulic jack 55 supported by jacking head 57 against which said jack 55 exerts force and pulls cables or other type reinforcements 7 into a desired tensioned prestress preload. The jacking head back-up harness element 57 is spaced from the rotatable end block 60 by spacers 58. Elements 54, 55, 56, 57, 58 and 60 comprises the prestressing apparatus when bolted together with bolts 51. The apparatus is adaptable for length and for placing any loading of prestressed preload desired within the range of the jack and the strength of the apparatus. The prestressing apparatus rotates on bearings 81 in a bearing groove of member 80. The apparatus can be used horizontally or vertically depending upon handling devices at hand for handling the elements.

Roving 63 is mounted on several unwinding spindles and a predetermined number of strands 7 are pulled through a spacing device 82 after impregnation and being covered with plastic resin composition 3 in going through dipping vat 83. Guide roll 85 and hold down roll 84 help keep the fiber oriented.

After the cables 7 are tensioned to a desired preload I spin the element, e.g., a pipe section 1, in its hydraulic jacking apparatus and while under prestressed preload and wrap a predetermined number of helically wound strands 7 around the pipe element 1 and cover the grooves 89 and cables 7 with the resin composition carrying helically wound reinforcements. The layer is built up to a predetermined thickness and, if desired, an additional layer of plastic resin composition and a filler therefor is spray spun by means of the apparatus of FIGURE 7. The apparatus can be used for any convenient length, the prestressing cables 77 being made the length of the pipe, tank or conduit element 1 plus any additional length needed for anchorage and tensioning.

FIGURE 9 shows a complete plant equipment set-up for sprays, spinning and tensioning and compressing equipment.

A concrete base 68 is connected to two end supporting walls 48 through which bearing sleeves 49 hold bearings 69 in which shafts 50 can spin. A jack bearing harness 53 is securely locked to shaft 50 by element 52.

A precast concrete pipe element 1 is placed against jacking bearing harness 53 and jack pressure harness 54 is placed against the opposite end of the precast pipe element 1. Jack 55 in its bearing harness 56 has tie rods 51 in it so that the tie rods 51 can be pushed through the pipe element 1 and locked in place against the outer face of jack bearing harness 53. By the tie rods 51 being placed the pipe element 1 is secured to the rest of the jack harness. Back-up harness element 57 is placed against the hydraulic jack 55 and spacer blocks 58 placed against element 57. The jacking apparatus is thus securely bolted against rotator bearing harness 60 by tightening bolts 51. Rotator bearing harness 60 has shaft 59 securely locked to its body and shaft 59 extends through end wall 48 through bearing end 69.

With the tie rods 51 hand tight bolted and connecting the several elements together the apparatus is now ready to induce a prestressed preload into the concrete material of pipe element 1 by force generated mechanically by the hydraulic jack 55. By actuating jack 55 a predetermined prestress is thus induced, i.e., puts the concrete material in compression preload.

When longitudinal cables 77 are used and the design calls for said cables to carry a mechanically induced prestressed preload, the cables 777 are inserted through the anchorages of elements 53 and 56 and the enlargements 77 of the cables 777 used as bearings whereby when the jack 55 is actuated to a predetermined tensile stress preload, then the desired prestressed preload is thus induced into the said cables 777.

With the pipe element 1 in a state of compression prestressed preload and the cables 777 in a state of tension prestressed preload the next step can be accomplished.

Motor 66 is started and speed control 65 set at a predetermined speed. Shaft 70 is rotated at this speed and spins drive pulleys 61 set in support bases 62. With the drive pulleys 61 turning elements 53 and 60 the entire spinning apparatus and prestressing jack device spins at a desired speed.

Strands of fiber 7 from roving coils 63 are fed through sizing rolls 53 and 44 and pulled through feed rolls 41 and 42 and secured to a desired place on the pipe element 1 just prior to starting the spinning motion of the pipe element 1.

Spray guns 39 and 40 used together or on occassion alone, are started and plastic resin composition 3 drawn from tanks 35 and 36. The spray guns 39 and 40 are mounted on a moving device, not shown, on shaft 46 so they can travel at a predetermined speed and cover the fiber strands 7 as they are being wound on the turning pipe element 1. By advancing the guns along the pipe element an even layer of plastic resin composition 3 is placed and an even amount of fiber reinforcement 7 is embedded and covered. A surface construction layer of desired cross-section and having a desired penetration and permeation of its plastic resin composition in, on and bonded with the concrete pipe element 1 is thus formed.

The longitudinal cables 777 can be layed in the surface layer but I find that a grooved construction is preferred when cables have any significant diameter e.g., above ¼", but not limited thereto. The cables 777 can be of fiber glass strands or of roving, of nylon strands, polyethylene terphthalate, Dynel, Orlon, acrylic fibers, metal, steel cable, rod or wire, or in fact any suitable tensile reinforcement. Cables 777 can be used without being prestressed but generally much saving in cost is had by prestressing, especially in long lengths. The prestressed preload induced into the concrete material as a compression load is captured and held permanently by the plastic resin composition when it converts from its flowable state to its solid state. By balanced engineered design of components little or no loss of prestress due to plastic flow of the composite construction is had and constructions like concrete pipe elements usually worked in loadings where an extra tensile or flexural load could cause failure in e.g., the concrete component can by this invention be worked under more or less prestressed loading and always keeping the concrete in compression and having it not enter the tensile phase. The apparatus of FIGURE 9 can be of any desired size and no limitation is intended. Handling equipment and processing means are the criteria for size of elements processed and made.

The shrinkage forces of plastic resins e.g., unsaturated polyester resins induce prestressed preload into the composite construction as the resins set, fix, shrink and polymerize from a flowable material composition to a solid.

From the above disclosure a preferred method in certain constructions is the method of making a prestressed reinforced hollow cylindrical construction adapted to support substantial interior pressures and external loading comprising the steps of providing at least one preformed cylindrical hollow body of porous structural material, placing said body under compressive load, said load being applied at its ends and longitudinally of said body, applying an initial layer of polymerizable resin composition which penetrates the surface to a discrete depth and permeates the body of said porous cylindrical body and leaves a surplus of resin composition on the exterior surface of said body, applying a plurality of unidirectional strands of fiber glass under tension spaced substantially equidistant from each other on said surface of said body and spanning said body longitudinally, and while applying additional resin composition, embedding said glass fibers in said resin composition, bonding and curing said resin composition and embedded glass fibers to a set plastic resin-glass fiber reinforced material and on completion of said curing, release said porous cylindrical body from compression making said prestressed reinforced hollow cylindrical body ready-for-use.

Thus is such a product made. The method of making a prestressed integrally laminated hollow cylindrical construction adapted to support substantial interior pressures and external loading comprising the steps of providing at least one preformed cylindrical hollow body of porous structural material, placing said body under compressive load, said load being applied at its ends and longitudinally of said body, applying an initial layer of polymerizable plastic resin composition which penetrates the surface to a predetermined depth and permeates the structure of said porous cylindrical body adjacent thereto and leaves a surplus of resin composition on the exterior of said body, winding a plurality of helically disposed layers of fiber glass roving under tension over and in said surplus of resin composition on said body and while applying additional resin composition embedding said fiber glass roving in said resin composition, bonding and curing in, on and to said hollow cylindrical body said resin composition and fiber glass roving disposed therein to a set plastic resin-fiber glass reinforced integrally laminated prestressed hollow construction.

The method includes the method of making a prestressed reinforced integrally laminated hollow cylindrical construction as shown above in which in addition on said embedded plurality of unidirectional strands of fiber glass and while applying additional polymerizable resin composition, embedding and winding a plurality of helically disposed layers of fiber glass rovings under tension over said surface of said plurality of resin embedded unidirectional strands of fiber glass and bonding and curing in, on and to said hollow cylindrical body the said resin composition and fiber glass strands and rovings to a set plastic resin-fiber glass reinforced prestressed integrally laminated hollow construction.

FIGURE 10 is an enlarged scale section of an embodiment of one kind of construction of this invention. Here, the central body of concrete has on each face a coating 223 of plastic-resin binder with fillers and mat-type fiber glass reinforcement. A uni-directional high strength fiber glass 224, which may be made of parallel fibers, cables, rovings, cords, wires, or ropes, of glass or other tensilely strong material, i.e., in the range of 10,000 to 125,000 p.s.i. tensile strength, is laminated in the resin-plastic over the mat reinforcement of the inner layer 223.

Embedded in, or instead of, one of the layers 223, 224, metal tubes or wires may be provided for circulation of fluids or for electrical resistance heating.

On the surface of this structure, a plastic-resin layer 225 is integrally combined, which constitutes the wearing surface, and may include decorative colors, fabrics, papers or prints. Such construction is also advantageous for members used in construction of schools, factories, homes, etc., whereas in purely functional apparatus, the decorative elements of the structure may be omitted.

FIGURES 11–14 show embodiments of the invention adapted to high pressure concrete pipe conduits.

Figure 11:
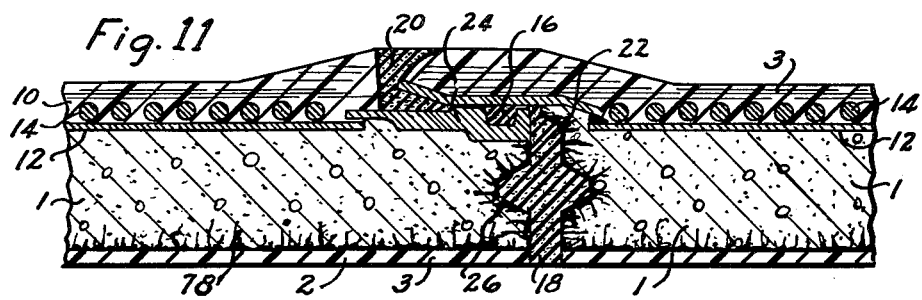
FIGURE 11 is a cross section of a portion of the wall of a prestressed concrete cylinder pipe, tank or vessel.

In FIGURE 11 concrete pipe element 1 is precast against a metal shell, e.g., steel cylinder 12 and has known end ring connections, e.g., a bell ring placed over a spigot ring which has a rubber gasket as disclosed in F.F. Jenkins Patent No. 2,348,477 issued May 9, 1944 or like that disclosed in L. G. Wilhelm Patent No. 2,470,009 issued May 10, 1949. The steel shell 12 is spirally wound with prertressing wire 14 in known manner. Since the prestressed steel reinforcement in this example is near the surface it is usually covered with a layer of concrete. In areas of contaminating environment, e.g., acid soil, the steel reinforcement can be destroyed by acid action through the thin concrete shell covering. In areas of earthquake or the like, vibratory forces tend to spall or crack the concrete and open the steel to attack and corrosion.

By means of this invention a "spray-spun" laminated layer 10 of fibrous reinforcement and resin composition and having a resin filler therefor, e.g. silica powder or other protective fillers, e.g., an epoxy resin based lead filled thermosetting compound that provides a homogenous laminated surface construction layer adapted for use as a radioactive shield or other high density shielding compounds.

Such a compound can be a composition of about 90% to 95% lead by weight and have a density of from 5.5 to 6.7 grams per cc. By reason of the epoxy resin component the compound is stronger than pure lead and even without fibrous reinforcement has more structural rigidity than pure lead. Other known materials other than lead useful for such purposes can be used as fillers, there being no limitation intended.

Polyethylene resin and lead can be used in a composition of about 90% to 95% lead by weight and 5% to 10% polyethylene by weight (hydrocarbon polyethylene) which has a specific gravity of about 6.5 to 7.0 grams per cc. The polyethylene lead binder resin does not contain nitrogen or oxygen, and consists essentially of molecules of $C_2H_6$.

The polyethylene containing lead is melted at about

210° to 230° F. into a low viscosity fluid. At the melting temperutare and up to 300° F. the fluid is of such a nature that fibrous reinforcement pulled through a dipping vat and wrapped around a concrete element pipe or block as in FIGURE 11 can be laminated into a layer of discrete thickness when I do the operation in a controlled environment. By keeping the epoxy-lead composition fluid it is easily worked.

Other resins and substances can be likewise used and the art of resins contains materials adapted to the present invention.

The two examples provide a smooth finish and high chemical inertness to acids, alkalies and other corrosive influences and provide materials adapted for use as a shield for nuclear applications. The high content of leads aids in shielding against beta and gamma rays. The hydrogen content in the polyethylene aids in shielding against neutrons. The formulations are infinitely variable even in the present state of the art.

Joint 18 can be a preformed element which is of packaged-ready-for-use construction as disclosed in my copending application Serial No. 345,084, filed March 27, 1953. It can alternately be poured-in-place and be of material like that of 1. Joint 20 is advantageously made of epoxy-lead or polyethylene-lead composition and poured in the field on the installation of the pipe element. Shoulder 22 aids in holding joint 18 in place. Groove 26 can be a shape and size to receive joinery element 18 for a secure fit thereof. The inside of the pipe element 1 is advantageously laminated with a surface layer construction comprising plastic resin composition 3, fibrous embedded reinforcement 2, e.g., Fibrafrax, aluminum silicate fiber, fiber glass fiber or a high temperature ceramic fiber, laminated and bonded to pipe element 1 by the fingers of resin and anchorages of resin plastic composition 78 in the body of the pipe element 1.

Such a construction is designed to provide protection for potable water supply mains, and conduits or the like, against residual radiation fallout which can be brought into water supply systems through the concrete walls of the conduit systems, i.e., of the present concept of construction.

Figure 12:
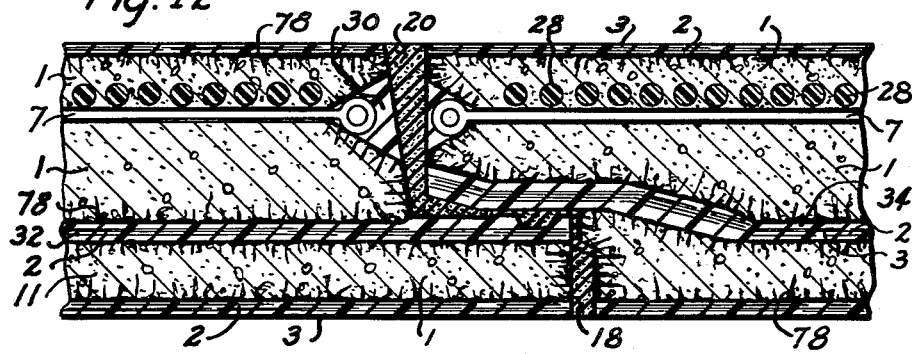
FIGURE 12 is a cross section of a portion of the wall of a prestressed reinforced laminated concrete pipe, tank or vessel embodying the invention.

FIGURE 12 is another embodiment wherein all reinforcement is nonmetallic being provided by fiber glass or other strands and fibers.

A concrete element 1 is precast with longitudinal holes or slots in which to place cables 7. A helically spun fibrous reinforcement 28 is spun around the cables 7 and pipe element 1 and additional concrete 1 or "resin-crete" or "elastomer-crete" of my invention cast around the outer face. When this is cured and set a surface layer lamination of plastic resin composition 3 fibrous reinforcement 2 and/or 7 and a surplus of resin composition over that needed to impregnate the fibers is bonded into, on and of the concrete body of as shown permeated into the body at 78.

On the inside face of pipe element 1 laminated layers 32 and 34 are provided bonded to a porous structural material 1 which has an inner lining surface construction layer of plastic resin composition 3 fibrous reinforcement 2 bonded to the porous structural material 11, e.g., lightweight concrete or e.g., high density concrete, by "fingers" of resin composition 78. The cables 7 are secured by high strength resin composition 30 at the end anchorages. Joints and joinery 18 and 20 can be laminated preformed joinery of my invention or can be poured in place resinous or plastic compounds adapted to specific needs and uses. A balanced designed construction is made from the various elements and the preferred construction is adapted to resistance to high dynamic loads as well as to resistance to chemicals or radioactive agencies. The resiliency of structure is of primary importance and I prefer embodiments being tough and rubbery and resilient rather than brittle and hard. By impregnating the concrete and permeating its pores with plastic resin compositions of discrete properties I make a new composite material having the designed tough, strong and rubbery resilient properties of the invention. The original high compression values of the concrete or other porous structural material are increased and the concrete's other properties in tension, shear and torsion are materially improved, and in a designed structural engineering manner.

FIGURE 13 shows a preformed laminated construction layer having fibrous looped reinforcement cables 7 a part thereof and extending in looped fashion into the porous structural material of the lamination. In this embodiment the preformed laminated construction is provided packaged ready-for-bonding and a concrete body cast around it and cured before the next step. A steel shell 12 may be used and an outer concrete shell may be used or any of the features of FIGURES 11–12 may be combined in any specific construction.

Figure 14:
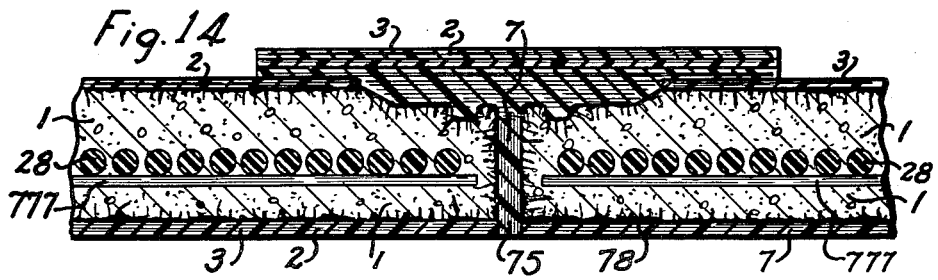
FIGURE 14 is a cross section of a portion of the wall of a centrifugal spun pipe having a laminated joint.

FIGURE 14 shows a typical centrifugally cast concrete pressure pipe embodying features of the invention. Reinforcement 777 and 28 is first assembled into a "cage" and then the concrete is spun around it and cured. I have found that for certain concrete mixes a period of 3 to 7 days under moist curing is what is required followed by 21 days air curing. The knowledge of the art is relied on as concrete mixes vary, environment varies and no general rule is acceptable. A.S.T.M. laboratory tests is the only criteria safe to use.

When cured the concrete pipe element 1 is laminated by the methods herein disclosed, i.e., on its inner and outer faces with a surface construction layer, e.g., an advantageously used layer of polyester resin composition or e.g., polyester-epoxy resin composition, or e.g., an unsaturated polyester containing monomeric methyl methacrylate blended with 10% to 25% monomeric styrene or vinyl toluene and a filler therefor and combined with fibrous strands, e.g., fiber glass roving. Reinforcement elements 777 are shown as fiber glass strands but any tensile reinforcement of metal or fiber alone or together and adapted to any specific structural or civil engineering design may be used. Helically wound reinforcement 28 is advantageously fiber glass and plastic resin composition. The reinforcement 777 and 28 may be an embodiment of my invention, the packaged cable-like constructions packed ready-for-use as disclosed in my Patent No. 2,671,158.

Figure 15:
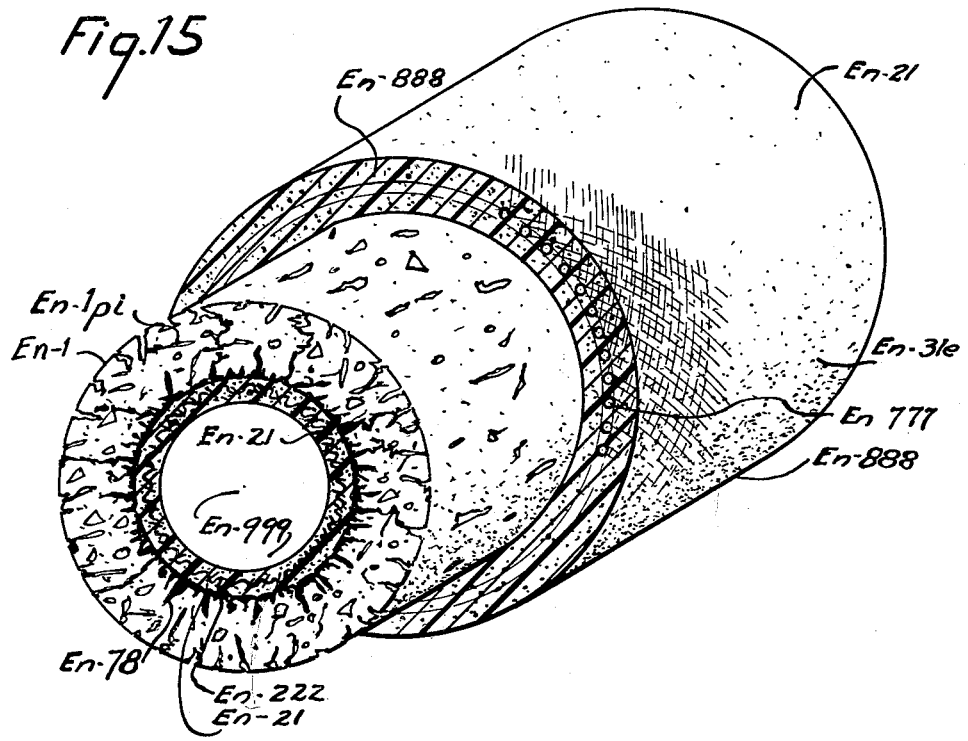
FIGURE 15 is an enlarged section figure showing features of the invention comprising composite structure of the materials of the invention.

FIGURE 15 is an enlarged sectioned figure showing features of this invention of one example of structure made by the materials of the invention. (Enlarged delineation of features is shown by the letters "$En$".) The concrete $En$-1 is advantageously a precast concrete pipe body having a definite predetermined pore structure interconnected with interstices normal to concrete materials in their set state. The density of the aggregate, the cement used, the sand used, and the nature of the manufacturing process used in making the said concrete pipe body comprise factors of materials engineering design of such bodies. Of importance is the feature that the amount of storage space required in the said body be calculated to that ratio of composite structure sought for in the final end product, e.g., 15% porous space, or 20%, or 30%, or any percentage which is advantageously available in the precasting art of concrete pipe bodies. The defined space is utilized by filling with "fingers $En$-78" of the resin-filler that is impregnated into the body structure of the concrete pipe body. The inside surface of said pipe is laminated with a filled-resin, e.g., a lead-filled resin composition $En$-21 in which is embedded a, e.g., multi-directional mat of fiberglass strands $En$-222, which advantageously provides a glass-like surface. Pores and interstices $En$-$1pi$ are considered to be storage vessels and the resins therein and walls, thereof hold the internally stressed resinous materials in a state of prestressed preload as well as capture mechanically or thermally induced prestressed preloads.

This is disclosed supra and the practice of this invention requires different combinations of materials structure in its embodiments. The outside of a pipe structure of this invention may comprise several different reinforcing means, e.g., unidirectional fiberglass strands E$n$–777 protected and covered by heat resistant fiber, e.g., Fibrefrax, e.g., quartz fibers applied as sleeving E$n$–888 with all fibers and fiberglass embedded in a resinous composition E$n$–21 of the invention. In this resin composition there may be a filler E$n$–31$e$ directed to a specific resistance feature. This filler can be a lead powder, or ground mineral, or ceramic fibers used as fillers in the resinous mix, but is not limited to said materials.

The features of FIGURES 11–14 are combined in practice in embodiments other than those shown and no limitation is intended in making any compatible combination of construction.

I make concrete take on new properties in flexure, tension, compression, shear and torsion, and particularly in flexure by the improvements of this invention of chemically prestressing prestressed preloads into concrete, alone or in combination with thermal and/or mechanically induced prestressed preloads. It is a composite material having the properties of its original components and as set in combination with set plastic resin compositions that are reinforced with fibrous reinforcement or are used alone for their own properties. Concrete, a brittle glass like material, which spalls on impacts is made by the instant invention, a tough rubbery, denser stronger material in which the concrete body provides in its pores the storage space for the plastic resin reinforcements in and of the body as well as the best anchorages for laminations of fiber glass or other fibrous reinforcement as well as conventional steel and prestressing steel reinforcement in its body or on its body or in the laminated layer above the surface of the body by being adhered and bonded to the porous structural body.

The following examples show some but by no means all of the formulations and constructions illustrative of the present invention:

EXAMPLE I

A 36″ diameter syphon in a water supply system is made as follows:

Hume type centrifugal concrete pressure pipe is provided precast in lengths of 8 ft. to 12 ft. and having a 3⅛″ minimum wall thickness and in its raw concrete state designed for 0 to 150 ft. heads with maximum allowable unit stress in the steel of 12,500#. The exterior surface of this pipe is to be protected against adverse chemical action and I designed a ¼″ thick plastic resin fiber glass laminated construction for this purpose as follows.

Mix design:
 100 parts by weight Paraplex P–444 (Rohm & Haas Co.) An unsaturated polyester containing monomeric methyl methacrylate and monomeric styrene or vinyl toluene-blended 80% Paraplex P–444 with 20% styrene monomer (or vinyl toluene).
 1 part by weight benzoyl peroxide.
 25 parts by weight aluminum silicate powder—ASP 600.
 (This formulation will have a pot life of about 2.5 days at 77° F. and will cure at 180° F. in about 2.0 min. to 2.5 min.)
 Color may be added if desired.

The concrete pipe sections are secured in the apparatus as shown in FIGURE 9 and rotated at a speed adapted to lay the fiber glass roving on the concrete body in an even layer, each roving being side by side. A sufficiency of resin composition is laid on the pipe body by the spray guns to completely cover the pipe surface and provide enough for impregnation to a depth of 1″ into the pipe body. The pipe is rotated until the ¼″ cross section is built up—being subjected to a hot air stream from time to time to set up the laminate and given a final cure at a temperature of about 180° F. to 220° F. Alternate curing heat may be provided by infra-red ray lamps.

EXAMPLE II

In this example I make use of precast raw concrete elements having a concave inner surface and a planar exterior surface. These raw concrete elements can be made in a block machine or other mass production equipment with the resultant low costs of mass production techniques. Hexagonal and octagonal sections can result from the integration of six or eight elements with the interior being a cylindrical surfaced construction. Other sections of a plurality of elements can be used.

The raw elements e.g., 7⅝″ x 14″, but not limited to any size, on the planar face with the interior face being the arc obtained in any wall thickness, e.g., 4″ wall thickness. The wall can be solid concrete or can be a cored concrete element as made on a concrete block machine and cured in known manner. The edges of one or more of the raw elements can be grooved with shaped recesses or can have mated grooves and projections to form strong joints by methods of my invention.

The interior of the individual raw concrete elements, i.e., the curved face can be processed and dressed in the same way that I make concrete elements as disclosed in my Patent No. 2,805,448. The finished laminated and bonded plastic resin fiber glass or other plastic surfaced and integrated construction can be stock-piled as ready for use into composite pipe or vessel constructions.

At the same time or at a later date, these concrete reinforced plastic resin fiber glass elements are assembled into partially closed trough-like elements or completely closed pipe or process vessels. The joints are comprised of resilient plastic resin or plastic resin-fiber reinforced or elastomeric plastics made into laminated constructions and the fiber if made of unidirectional strands or constructions may be pre-tensioned or post-tensioned reinforcement with predetermined amounts of prestressed preload provided.

An adapter frame not shown in the figures of drawings is used to hold a number of elements so the features of prestressed preloaded forces can be applied in the integration of the concrete, plastic resin and a filler therefor if used, and the fibrous reinforcements into a unitary structure, e.g., a pipe having an octagonal exterior shape and cylindrical interior shape. By enclosing the reinforcement in a groove between the elements, the high strength tensile and flexural strength of the reinforcement is protected against chemicals and other adverse features including fire.

The features of the construction are advantageously used in making elliptical shaped or other non-cylindrical shapes. Expensive forms used for precasting such odd shapes are not needed because mass production equipment has no limitation on the mold box shapes it uses and any reasonable precast element adapted to elliptical or any other shape can be made in mass production equipment.

To illustrate but in no way limiting the concept of the invention the following shows one example of such a construction:

Required to make an octagonal exterior shaped pipe 100 ft. long made of one 40 ft. horizontal length connected to one 30 ft. length made at 30° upward slope which is connected to one 30 ft. length made at 90° upward from the horizontal length.

Concrete elements made of 5,000 p.s.i. compression tested raw concrete, e.g., fire expanded shale aggregate Portland cement concrete.

Concrete elements to be impregnated and permeated to an average depth of 2″ by the plastic resin composition. Concrete elements to test to about 15,000 p.s.i. in compression, i.e., the composite material of plastic resin composition as a completed polymerized material in the concrete and of the concrete tests at 15,000 p.s.i.

Fiber glass cables composed of 65% glass by weight unidirectional fiber and enclosed in epoxy resin composition, the total fiber and resin material being enclosed in a polyethylene 4 mil tube, said cables having end enlargements with loops adapted to anchorage in mechanical prestressing equipment.

Typical mechanical properties of a cable-laminate cured with 4,4′ methylene dianiline using an epoxy resin: molecular weight 350 to 400 a cure cycle of 1 hour at 160° C. under pressure and postcured 2 hours at 150° C. plus 6 hours at 200° C. have the following properties:

*Properties*

| | |
|---|---|
| Tensile strength, p.s.i. | 50,000–58,000 |
| Tensile modulus, p.s.i.×$10^{-6}$ | 3.3–3.6 |
| Compressive strength, edgewise, p.s.i. | 49,000–51,000 |
| Compressive modulus, edgewise, p.s.i.×$10^{-6}$ | 3.3–3.6 |
| Flexural strength, p.s.i.: | |
| At 25° C. | 79,000–89,000 |
| At 127° C. | 52,000–60,000 |
| After 2 hr. in 100° C. water | 77,000–82,000 |
| Flexural modulus, p.s.i.×$10^{-6}$: | |
| At 25° C. | 3.6–3.9 |
| At 127° C. | 3.0–3.5 |
| After 2 hr. in 100° C. water | 3.2–3.6 |
| Impact strength, Izod | 12–15 |
| Hardness, Rockwell M | 115–117 |
| Water absorption, 24 hr. at 25° C., weight gain, percent | 0.05–0.07 |

The resin-modifier-curing-agent system provides a major variable in laminating formulations. Laminating pressure, resin content, and curing cycle are mutually interdependent with regard to the effect on the resultant properties of any given formulation. Properties are also dependent to a certain extent to the application technique. Room-temperature strengths may be considered typical of the relationship between laminating pressure and flexural strengths, as example.

| Pressure, p.s.i.: | Flexural strength, p.s.i. |
|---|---|
| 3 | 38,000 |
| 25 | 63,000 |
| 200 | 78,000 |

Generally, with the resin content being held constant, the effect of laminating pressure is slight:

| Pressure, p.s.i. | Flexural strength, p.s.i. | Flexural modulus, p.s.i.×$10^{-6}$ |
|---|---|---|
| 30 | 67,000 | 2.8 |
| 100 | 67,000 | 2.8 |
| 300 | 70,000 | 3.0 |

The resin chemist in the knowledge of the art of resin compounding can provide construction directed to specific end use requirements and the above is a very brief illustration of engineering design in this field of art.

To assemble such a construction I first connect a series of elements end to end with resin bonded fiber glass reinforced joints as disclosed and claimed in my copending applications to form beam-like components 30 ft. or 40 ft. long as the case may be for the required lengths of this structure. Lengths are made to form the angled connections as above required, the individual lengths being placed on a make up table or platen and retained in holding harnesses as disclosed in the parent application to this application. When all beam-like components are made ready the components are assembled in an adapter frame and the prestressing cables laid in the grooved space in the edge of the assembled components so that the entire pipe line is put together ready for post-tensioning of the cables by means of the hydraulic jack device disclosed in the parent application Serial No. 345,084, filed March 27, 1953 and an induced mechanically applied prestressed preload induced into each cable until the entire pipe line is in a prestressed preloaded state. The resin portion of the packaged cable is activated to polymerization by means at this time and the induced prestressed preload captured as the resin composition sets and cures. The polymerization can be from catalyst contained in a rupturable package which mixes into the resin when prestress preload is applied to the cable or it can be from heating means inclosed in the package or adjacent to the package cable as shown in my Patent No. 2,671,158.

The resin composition can be a premixed composition which sets with time, a "pot-life" being had allowing for the proper placement of the cable in the groove in the concrete component. The polyethylene envelope 4 mil tube can be removed prior to placement which I do in some constructions when I want to bond the fiber glass cable continuously to the concrete. At other times all or only portions of the polyethylene envelope tube is left in desired places to form a non-bonded construction. The art of civil engineering applies here.

I sometimes make such a construction for use under sea water and in this case the exterior surface of the pipe line is laminated by winding roving spaced close together or by mat held in place by rovings of fiber glass or other desired fiber material which is bonded in place by a resin composition which may or may not have a filler therefor. Such a filler could be silica flour or any other specific purpose filler having a compatible chemical specification. The pipe may be wrapped as in Example I or may be laminated by low pressure means.

The concrete elements may be plano-convex i.e., planar one side and curved the other side in shape so that the exterior surface forms a cylindrical construction such as for a column or pile. The method may be similar to Example I or as above disclosed for making such constructions.

In making predetermined amounts of prestress preload that is induced into any given construction by the forces derived from the polymerization reaction I have found that combination of resins each having specific properties provides a sure and ready means of deriving specific amounts of internal stress. An example stressing type of plastic resin composition can be made by using polyesters based on a variety of polybasic acids and polyhydroxyl alcohols that contain free carboxyl groups and/or aliphatic hydroxyls capable of reacting with the epoxy resins. The wide range of molecular structures possible for the polyester resins together with co-curing reactions occurring when they are combined with epoxy resins provide me with resinous compositions modified to specific end uses. Polyesters of certain characteristics as well as polysulfides such as Thiokol rubbers are used as flexibilizers. The effect of the polyester on the epoxy resin on the combined properties is dependent on the acids and alcohols used in the synthesis and on the number of members in the resulting resin chain. If other reactive elements are added, the properties can be varied even more.

The shrinkage of epoxy resins is of a low order while that of e.g., polyester resins is of a relatively high order. Together with fillers and pigments I use the knowledge of the art of resin compounding to provide specific stress characteristics.

Because of the toughness and high adhesive properties of the epoxies they provide upgrading agents for other resins like the phenolics, ureas, furanes, polyesters, melamines, vinyls, and fluoro-carbons and even asphaltic material. Thus the phenolic-epoxy resin compositions may be used to improve heat-distortion temperatures of specific resinous composition systems. Such low priced synthetic resin systems I find can be used in fairly high percentages to reduce overall cost of any specific epoxy-resin system. Various phenolic resins and intermediates known in the art react with epoxy resins and cure them in the presence of an acid or base catalyst, e.g., phosphoric acid, caustic or dicyandiamide.

Urea formaldehyde and melamine formaldehyde resins cross-link with epoxy resins through methylol groups. Furfural resins containing methylol groups also act as modifiers for epoxy resins similar to methylol-bearing phenol and melamine resins to improve flexibility when used in the order of 25 phr., to improve chemical resistance to acids, specifically to hydrofluoric acid when used on the order of 65 phr. and also furfural resins reduce cost.

Vinyl chloride resins act as a heat stabilizer when combined with epoxy resin systems, the vinyl chloride resins losing HCl in the presence of heat. Small percentages of vinyl chloride acetate and vinyl formal resins improved peel and impact strengths.

Isocyanates as polyurethanes react with hydroxyl groups present in epoxy resin chains to provide crosslinking. The isocyanate groups will react with primary and secondary amines and are capable of co-curing not only with the epoxies but with any amine curing agent present to provide tightly crosslinked structures. Monomeric diisocyanates such as tolylene diisocyanate, diphenylmethane 4,4'-diisocyanate, and 3,3'-butolylene, 4,4'-diisocyanate are commercially available as reactive crosslinking intermediates.

Fluorinated resins while being insoluble in liquid epoxy resins and do not react with them can be combined in solution compounds to make co-acting polymerizable resinous compounds which are excellent high adhesive materials having a low water transmission due to the fluorinated resins.

Silicone polymers are usually very weak and soft mechanically, but do have high thermal stability imparted by the presence of the silicon atom. When combined with epoxy resins good mechanical properties and electrical properties are provided in the combination. Modifications of silicone adhesive with 10 to 40% of epoxy resins having a degree of polymerization of 1 have resulted in a marked increase in shear strength at 500° F.

Each particular resin formulation will exhibit its own specific properties, and through the judicious selection of components, it is possible to design systems exactly suited to highly specialized end uses.

a filler type formulation of epoxy resin composition is as follows:

| | Parts by weight |
|---|---|
| Mixed polymer/epoxy resin containing 25 parts by weight of a glycerol-based epoxy | 100 |
| Allyl glycidyl ether | 10 |
| Filler | 100 |
| Triethylamine | 12.5 |

A test formulation as follows was used with various fillers:

| | Parts by weight |
|---|---|
| Mixed polymer/epoxy resin | 100 |
| Trimethyl amino methyl phenol | 10 |

*Effect of fillers on shear strength of adhesive formulation*

| Fillers, at 100 phr | Shear strength, p.s.i. | | | |
|---|---|---|---|---|
| | Phenolic linen laminates tested at— | | | |
| | 23° C. | 75° C. | 90° C. | 105° C. |
| Aluminum powder | 2,700 | | 1,470 | 1,390 |
| Ignited $Al_2O_3$ | 4,600 | 1,360 | 1,195 | 530 |
| Short-fiber asbestos | 1,740 | 1,270 | 580 | 510 |
| Carbon black | 2,000 | 555 | 980 | 910 |
| Silica | 2,840 | 1,600 | 1,250 | 830 |
| Zinc dust | 2,510 | 600 | 300 | 225 |

The data on epoxy resins is taken from "Epoxy Resins" by Henry Lee and Kris Neville, published from McGraw-Hill Book Company and from my own notes on development data.

EXAMPLE III

In this example I make a prestressed reinforced integrally laminated hollow cylindrical construction adapted to support substantial interior pressures and external loading and having a smooth interior surface.

One formulation I use is as follows:

Lupersol DDM-methylethyl ketone peroxide in dimethyl peroxide—2 parts by weight.
Polyester resin, Atlac 382, 60 parts by weight (dry resin); styrene monomer, 40 parts by weight—45 parts by weight of mix.
ASP 400 aluminum silicate—30 parts by weight of mix.
Glass fiber roving—25 parts by weight of mix.

*Typical commercial epoxy resins*

| Resin type | Color, 25° C. (Gardner) | Epoxide equivalent | Average molecular weight | Viscosity at 25° C., centipoises or Gardner-Holt | Melting point, 0° C. (Durans) |
|---|---|---|---|---|---|
| Bakelite Co.: | | | | | |
| ERL-2774 | 10 (max) | 185–200 | 350–400 | 10,500–19,500 | Liquid. |
| ERL-3794 | 5 (max) | 170–182 | 350–400 | 7,200–19,200 | Do. |
| ERL-2795 | 9 (max) | 194–179 | 340–400 | 500–900 | Do. |
| ERLA-3001 epoxy/phenolic | | | | 1,600–1,700 | 25° C. |
| Ciba Co. Araldite 502 | 4 | 250 | | 3,000 | Liquid. |
| Jones-Dabney Co. Epi-Rez-510 | 6 | 180–200 | 350–400 | 9,000–18,000 | Do. |
| Shell Chemical Co., Epon resins: | | | | | |
| 562 | 5 (max) | 140–165 | 300 | 150–210 | Do. |
| 820 | 8 (max) | 175–210 | 350–400 | 4,000–10,000 | Do. |
| 828 | 12 (max) | 175–210 | 350–400 | 5,000–15,000 | Do. |
| 815 | 8 (max) | 175–210 | 340–400 | 500–900 | Do. |
| 834 | 10 (max) | 225–290 | 450 | $A_2$–$A_1$ | Do. |
| 864 | 8 (max) | 300–375 | 700 | $A_1$–B | 40–50. |
| 1001 | 8 (max) | 450–525 | 900–1,000 | C–G | 64–76. |
| 1004 | 6 (max) | 870–1,025 | 1,400 | Q–U | 95–105. |
| 1007 | 8 (max) | 1,650–2,050 | 2,900 | Y–$Z_1$ | 125–132. |
| 1009 | 11 (max) | 2,400–4,000 | 3,800 | $Z_2$–$Z_5$ | 145–155. |

Typical of the room temperature curing agents useful in adhesive formulations are such crosslinking aliphatic amines as diethylene triamine, triethylamine, and diethylamino propylamine and catalytic amines such as tridimethyl amino methyl phenol. Strong acids, such as oxalic, are also used to give good room temperature shear strengths. A typical room-temperature curing agent and On a polished stainless steel mandrel having an internal heating device controllable to 5° F. plus or minus. On this mandrel I spray spin a layer of the above resin composition to completely cover the mandrel as it is slowly spun. The resin composition is gelled as applied and into this resin layer the fiber glass rovings are spirally wound as additional resin composition is sprayed onto the mandrel until a predetermined quantity providing the above cross section is applied.

During the time that I am applying the above formulation onto the mandrel, I also have a section of concrete pipe being dried of moisture and heated to about 180° F. On the dried surface I spray a layer of the above formulation of resin composition to which I add about 5% styrene monomer to get a desired penetration and spray until a desired amount of resin composition gels on the surface of the concrete. At this stage with both the concrete surface resin composition and the laminated fiber glass resin composition on the steel mandrel in a like gelled condition I then slide the mandrel into the concrete pipe. The heating device in the mandrel is advanced to 250° F. in this case and the entire construction bonded together as the polyester resin composition polymerizes to a cured state. The polyester resin composition in the concrete and on it having additional styrene monomer (about 5%) shrinks more than the layer on the mandrel so that the laminated layer is drawn in toward the concrete as the composite laminated construction cures to a unitary construction. On completion of the cure of the resin composition, in this case about 4 minutes, I cool the mandrel until the completed unit easily slides off from the mandrel. The resulting interior surface construction layer is very smooth and glass-like in its shiny appearance and is comparable with plate glass surfaces.

Various other fibrous reinforcement can be used of which the following are illustrative:

Ferro Unifab Style P970 fiber glass—finish 172 cloth—9.70 ounces/sq. yd.
Ferro Unirove Style 545 fiber glass—Woven roving.
Ferro Uniformat—HSB-2 fiber glass.

These reinforcements are in mat or fabric form and can be wrapped around the mandrel in one or more plies and are sprayed with enough resin composition to saturate the layer and with a surplus, so roving if wound around the layer or in between the layers, if a plurality of layers are used, to insure complete impregnation and coverage of the fibrous constructions. Preimpregnated mat or bat or fabric can be likewise used.

While a simple resin composition is given I use many different compositions known in the art and of my own invention and the general method here given is used with such variations as the resin compositions require. By using a catalyst type gun like the Binks gun or the DeVilbiss gun I spray spin a resinous composition in two components so that a quick setting catalyst can be used thus speeding up the operation or directly getting specific properties to the total construction. Any adaptable resin composition known in the art thus can be used and spray spun into a resinous fabric or construction.

The following is a partial list of commercial materials I use:

Plaskon Polyester Resin 941
Plaskon Polyester Resin 9600
Plaskon Polyester Resin PE-13 (self extinguishing)
Epon Resin—Formulation XA-200—Solution A
Epon 1001—for solids contents below 60% by weight, thin with n-butanol-toluene,1-1

| | Percent by weight |
|---|---|
| Methyl isobutyl ketone | 45 |
| Butyl "Cellosolve" | 5 |
| Toluene | 50 |
| | 100 |
| Epon 1001 | 97 |
| Beetle 216-8 [1] | 3 |
| | 100 |

[1] Beetle 216-8 is added as a leveling agent.

Epon Resin—Solution B:

| | |
|---|---|
| Ethylene diamine | 50 |
| n-Butanol | 17 |
| Toluene | 17 |
| Water (from technical grade amine) | 16 |
| | 100 |

Solution B is added to solution A with thorough stirring just prior to use or can be applied through a catalyst type two headed spray gun. The ratio of solution B to solution A will depend on the solids content of solution A, but addition should be adjusted so that 6 parts (by weight) of pure ethylene diamine are added to 100 parts (by weight) of resin solids. Improved formulations are constantly being presented and no limitation is intended in the examples given.

Vibrin 117—Polyester Resin—100 parts by weight
Lupersol DDM—2 parts by weight
Luperco ATC—1 part by weight
Cobalt Napthenate (6%)—.03 part by weight per 100 of resin
Versamid 115—General Mills Co.—50 parts by weight
Bakelite ERL 2795—50 parts by weight
AFD Filler (Alum. Flake Co.)—20 parts by weight NOTE.—Plaskon resins are made by Barrett Div. of Allied Dye & Chemical Corp., New York, N.Y.; Epon resins are made by Shell Chemical Company, New York, N.Y.; Vibrin resins are made by Naugatuck Chemical Company, Div. of U.S. Rubber Co., New York, N.Y.; Versamid resins are made by the Chemical Div. of General Mills, Kankakee, Illinois; Bakelite resins are made by Bakelite Co., a Div. of Union Carbide & Carbon Corp., New York, N.Y.

The materials used in my invention have been described and such description is not limiting to the materials described or to the methods of use of said materials, variations and additions being within the scope and intent of disclosures made. This statement is of particular reference to the plastic resins and elastomeric substances useful in my invention because of the great amount of development in plastics and plastic resins being carried on in science and industry.

The following are examples of spraying type room-temperature epoxy resin compositions:

Solid tough type.

| Epoxy resin: | |
|---|---|
| Softening Point (° C.)—Mercury method (Durrans's) | 70 |
| Specific gravity | 1.21 |
| Weight per gallon (lb.) | 10.1 |
| Viscosity (40% in butyl carbitol) | E |
| Bulking value (gal./lb.) | 0.009 |
| Color (40% in butyl carbitol) | 4 |
| Esterification equivalent (grams of resin esterified by 1 gram-mole of monobasic acid) | 130 |
| Epoxide equivalent (grams of resin containing 1 gram equivalent of epoxide) | 485 |
| Epoxy value (epoxide equivalents per 1000 grams of resin) | 2.05 |

A specific formulation for spraying:

| | Parts by weight |
|---|---|
| Epoxy resin | 580 |
| Toluol | 195 |
| MIBK | 175 |
| Butyl cellosolve | 20 |

Dissolve and add:

| | |
|---|---|
| Beetle 216-8 (60%) | 30 |
| | 1,000 |

Before use, reduce the above with:

| | Parts by weight |
|---|---|
| Diethylene triamine | [1] 36 |
| Xylol | 18 |
| Butanol | 18 |
| | 72 |

[1] 6% on solids.

Then add the following solvent-blend to obtain the desired viscosity:

| | Parts by weight |
|---|---|
| Toluol | 500 |
| Butanol | 500 |
| | 1,000 | or use

| | Parts by weight |
|---|---|
| Toluol | 500 |
| MIBK | 450 |
| Cellosolve | 50 |
| | 1,000 |

To cure:
Bake for 20 min. @ 200° F.
Or 10 min. @ 250° F.
Or 7 min. @ 300° F.
Or 4 min. @ 350° F.
Or 2 min. @ 400° F.
Or 1 min. @ 450° F.

Polyamide portion made as follows:

| | Parts by weight |
|---|---|
| Versamid 115 | 600 |
| Tolul | 360 |
| Cellosolve | 40 |
| | 1,000 |

Final blend mixing:

| | Parts by weight |
|---|---|
| Resin portion | 65 to 68% |
| Polyamide portion | 32 to 35% |

Make the final blend just prior to use. Thin to viscosity desired with the following solvent-blends:

| | |
|---|---|
| Toluol | 500 |
| MIBK | 450 |
| Cellosolve | 50 |
| | 1,000 | or

| | |
|---|---|
| Toluol | 500 |
| Isopropyl or butyl alcohol | 500 |
| | 1,000 |

Above recommended Epoxy resin is Araldite 6071 as made by Ciba Company, Inc., New York, N.Y.

An Epoxy resin combined with Polysulfide rubber resin is as follows:

| | Pounds | Gallons |
|---|---|---|
| Resin Portion: | | |
| Epoxy resin—Araldite 6010 | 260 | 26.70 |
| Araldite 6071 | 175 | 17.33 |
| MEK | 104 | 15.50 |
| Beetle 216-8 | 39.25 | 4.61 |
| Polysulfide Portion: | | |
| Thiokol LP-3 | 217 | 20.50 |
| DMP-30 | 44 | 5.36 |
| MEK | 67.10 | 10.00 |
| | 906.35 | 100.00 |

NOTE.—Mix resin portion and polysulfide portion very well before use.

A variety of fillers, pigments, and dyes can be incorporated into either one or both of the component parts. Titanium dioxide, zinc sulfide, silica, carbon black, and powdered aluminum may be used. However, aluminum-type fillers should be added only to the resin portion as the amine-catalyst (DMP-30) in the polysulfide portion will react with these after prolonged contact. These mixtures will cure at room temperature or at elevated temperature in from 3 days at 60 to 90° F. to 3 min. at 350° F. with temperature being the direct factor of time in the cure.

The knowledge of the art of such resin compounding is constantly expanding and the examples given are for illustration and are not limiting upon the examples given as the invention here disclosed applies such art to the combination of concrete or other porous structural material as available for the pipe, tanks or vessels made with resin compositions, elastomeric composition and synthetic or rubbery materials.

One of the important elements is the shrinkage factor of each resin or combination of resins or discrete components used in the formulations containing resins since the forces developed by the shrinkage or otherwise induced into the composite pipe structure or vessel structure are put to work to prestress the construcions. Another important element is the adhesive and bonding strengths developed by the resins and other discrete components. The penetrating and permeating characteristics from manually, mechanically or capillaryily induced forces are factors in the structural design of constructions. The relationship to temperatures and changes thereof and particularly ambient tempatures will partly determine selection of resins used for specific constructions.

The fibers selected are subject to stress analysis and each use dictates selection based on cost, availability and strength characteristics. Fiber glass, at present, is preferred as the highest strength economical material (300,000 to 1,000,000 or more p.s.i. ultimate strength in tension) with respect to tension loading. Fiber glass has other definite advantages and characteristics inherent to its nature. This does not preclude any other fiber or strand adapted to any use in this invention being used where necessary.

Concrete and other porous structural materials are depended upon almost universally. These are many aggregate sources by which the engineer can design and construct good concrete or porous structural material qualities. Volcanic derived aggregates, man made calcined materials, selected rock and sand aggregates and any other commercially practical concrete materials are used. Portland cements, natural cements and resin binders are used to make concrete and concrete like materials in the full measure of the art.

It is understood that it is intended to cover all changes and modifications of the examples of the invention herein chosen for the purpose of illustration which do not constitute departures from the spirit and scope of the invention. Having disclosed numerous embodiments of my invention I claim:

I claim:

1. A prestressed reinforced composite concrete pipe construction having substantial impact resistance to dynamic loading and being substantially impervious to the entrance of adverse chemicals, said pipe comprising a porous concrete pipe body having open pores and interstices connected therewith, said pores and interstices in the neighborhood of the surface of said pipe construction being substantially filled and covered by a layer of tough, rubbery, reinforcing resin composition penetrated and permeated into said pores and interstices and having a surplus of said resin composition on the surface thereover, said surplus comprising a layer of polymerized resin composition containing filler, said layer having helically disposed continuous unidirectional fiberglass strands under tension embedded therein, said fiberglass strands having substantially 3% capability of extension under loading at less than its ultimate load capacity and substantially complete recovery to original state as before loading, said polymerized resin composition having properties of extension and recovery at least equal to that of said fiberglass strands, said combination of fiberglass strands and said polymerized resin composition and filler therefor providing said impact resistance to dynamic loading by its high strength and capability to change the phase of cyclic inputs of dynamic energy.

2. A prestressed reinforced composite concrete pipe construction as in claim 1 wherein said surplus layer has therein strands of heat resistant inorganic fibers whereby said inorganic fibers protect said fiberglass unidirectional strands against heat.

3. A prestressed reinforced composite concrete pipe construction as in claim 1 wherein said polymerized resin composition comprises a thermoset resin composition.

4. A prestressed reinforced composite concrete pipe construction as in claim 1 wherein said pipe construction also contains additionally synthetic fibers, whereby said synthetic fibers protect said pipe construction against adverse chemicals and increases the resistance of said composite concrete pipe body against shear, torsion and compression loadings.

5. A prestressed reinforced composite concrete pipe construction as in claim 1 wherein there are additionally, fiberglass strands that are multi-directional and there being steel reinforcement in said pipe body.

6. A prestressed reinforced composite concrete pipe construction as in claim 1 wherein said tough, rubbery, reinforcing resin composition includes protective filler material providing high density shielding compound protective against atomic wastes and providing a radioactive shield, said filler material being a composition of about 90% to 95% lead powder to 5% to 10% of polymerized resin composition.

References Cited in the file of this patent

UNITED STATES PATENTS

| | | |
|---|---|---|
| 2,120,309 | Carson | June 14, 1938 |
| 2,236,108 | Miller et al. | Mar. 25, 1941 |
| 2,467,999 | Stephens | Apr. 19, 1949 |
| 2,594,693 | Smith | Apr. 29, 1952 |
| 2,614,058 | Francis | Oct. 14, 1952 |
| 2,706,497 | Shobert | Apr. 19, 1955 |
| 2,707,003 | Kennison | Apr. 26, 1955 |
| 2,751,775 | Sergovic | June 26, 1956 |
| 2,752,275 | Raskin | June 26, 1956 |
| 2,815,043 | Kleiner et al. | Dec. 3, 1957 |
| 2,850,890 | Rubenstein | Sept. 9, 1958 |
| 2,962,052 | Sergovic | Nov. 29, 1960 |

OTHER REFERENCES

Publication: (1) Concrete, June 1949, pages 12 and 45.
Publication: (2) Modern Plastics, November 1950, pages 113, 114, 116, 118, 120 and 122.